United States Patent
Bitzer et al.

(10) Patent No.: US 11,886,947 B2
(45) Date of Patent: Jan. 30, 2024

(54) METHOD FOR UNIQUELY MARKING OBJECTS

(71) Applicant: LEUCHTSTOFFWERK BREITUNGEN GMBH, Breitungen (DE)

(72) Inventors: Thomas Bitzer, Mönchengladbach (DE); Benedikt Daumann, Wallersdorf (DE); Dominik Uhlich, Bad Liebenstein (DE)

(73) Assignee: LEUCHTSTOFFWERK BREITUNGEN GMBH, Breitungen (DE)

( * ) Notice: Subject to any disclaimer, the term of this patent is extended or adjusted under 35 U.S.C. 154(b) by 0 days.

(21) Appl. No.: 18/258,250

(22) PCT Filed: Nov. 17, 2021

(86) PCT No.: PCT/IB2021/060644
§ 371 (c)(1),
(2) Date: Jun. 19, 2023

(87) PCT Pub. No.: WO2022/136966
PCT Pub. Date: Jun. 30, 2022

(65) Prior Publication Data
US 2023/0401411 A1    Dec. 14, 2023

(30) Foreign Application Priority Data
Dec. 22, 2020  (DE) .................. 102020134568.2

(51) Int. Cl.
*G06K 19/06*    (2006.01)
*G06K 19/08*    (2006.01)
(Continued)

(52) U.S. Cl.
CPC ..... *G06K 19/06037* (2013.01); *B42D 25/305* (2014.10); *G06K 19/086* (2013.01);
(Continued)

(58) Field of Classification Search
None
See application file for complete search history.

(56) References Cited

U.S. PATENT DOCUMENTS 7,353,994 B2   4/2008  Farrall et al.
7,576,842 B2   8/2009  Park
(Continued)

FOREIGN PATENT DOCUMENTS

DE    10304805 A1    8/2004
DE    102015219400 B4   4/2017
(Continued)

OTHER PUBLICATIONS

International Search Report and Written Opinion for corresponding International Patent Application No. PCT/IB2021/060644 dated Mar. 4, 2022.

*Primary Examiner* — Kristy A Haupt
(74) *Attorney, Agent, or Firm* — Greer, Burns & Crain, Ltd.

(57) ABSTRACT

A method for uniquely marking an object, wherein a random distribution of individual pigment domains is applied to a surface of the object, and wherein a list of distances of the individual pigment domains from one another is measured and stored in a database. Also a corresponding method for identifying an object by: capturing an image of the pigment domains, identifying the two-dimensional coordinates of each pigment domain captured in the image, determining the two-dimensional distance of each pair of two pigment domains and/or the angle of each triplet of pigment domains, storing the distances and/or angles determined in the step
(Continued)

before in a list, storing the list in the database, the list enriched with meta-information about the manufacturing and/or finishing parameters of the object, applying a database identification as an information unit to the surface of the object, the information unit uniquely assignable to the database.

12 Claims, 5 Drawing Sheets

(51) Int. Cl.
*G06K 19/18* (2006.01)
*B42D 25/305* (2014.01)
*G06K 19/14* (2006.01)
*G06V 20/80* (2022.01)

(52) U.S. Cl.
CPC ............ *G06K 19/14* (2013.01); *G06K 19/18* (2013.01); *G06V 20/80* (2022.01)

(56) References Cited

U.S. PATENT DOCUMENTS

| | | | |
|---|---|---|---|
| 10,019,627 | B2 | 7/2018 | Kutter et al. |
| 2011/0164748 | A1* | 7/2011 | Kohlert ................ G06K 19/086 |
| | | | 428/221 |
| 2016/0078307 | A1 | 3/2016 | Pawlik et al. |
| 2021/0150690 | A1 | 5/2021 | Kohlert et al. |

FOREIGN PATENT DOCUMENTS

| | | |
|---|---|---|
| DE | 102014207323 B4 | 8/2018 |
| EP | 2296912 B1 | 4/2015 |
| EP | 2930699 A1 | 10/2015 |
| EP | 2296911 B1 | 8/2016 |
| WO | 2010006582 A3 | 3/2010 |
| WO | 2010006583 A3 | 3/2010 |
| WO | 2019197628 A1 | 10/2019 |

* cited by examiner

METHOD FOR UNIQUELY MARKING OBJECTS

CROSS-REFERENCES TO RELATED APPLICATIONS

This application is a national phase of International Patent Application No. PCT/EP2021/060644, filed on Nov. 17, 2021, which claims the benefit of German Patent Application No. 10 2020 134 568.2, filed on Dec. 22, 2020, the entire disclosures of which are incorporated herein by way of reference.

FIELD OF THE INVENTION

The invention relates to a method for uniquely marking an object, wherein a random distribution of individual pigment domains is applied to a surface of the object, and wherein a list of distances between the individual pigment domains is measured and stored in a database, and a corresponding method for identifying an object.

BACKGROUND OF THE INVENTION

For individual marking and identification of an object, it is known to mark each individual object with a suspension of fluorescent or phosphorescent pigments. The suspension is so thin or low concentrated that only a few pigment particles or pigment domains are present in the coating. The distribution of the pigment domains is randomly distributed. The random pattern of pigment domains can be used to perform a unique identification of the individually marked object. The special feature of random marking with pigment domains is that the random patterns cannot be copied in an economical way. It is also known to mark banknotes or securities in this way to create counterfeit-proof and copy-proof bills.

In order to increase the protection against counterfeiting, it is also known to focus on special features of the pigments, such as relaxation time during phosphorescence, spectral composition of the fluorescence, but also the marking of the marker pigments themselves.

Marking and reading of the produced random pattern can be performed with special recording devices submitted for this purpose. Depending on the production throughput for an object, the marking effort can place high demands on an information technology to be used due to the simultaneous need to record the random pattern.

In order to be able to determine the authenticity of a marking, there are further developments of these marking systems in which the random pattern applied is assigned by an algorithm to a so-called hash, a coded number. This number, which can be derived unambiguously from the random pattern, is then cryptographically signed with a first secret key and the signed hash is printed on the object in a machine-readable manner. To verify the authenticity of the object, it is sufficient to generate this uniquely derivable number from the random pattern of pigment domains and compare it with the signed number applied to the object. The requirements for information technology are thus kept within manageable limits.

In the course of the so-called Industry 4.0, the digitalized accompaniment of all production processes, which allows all refinement steps to be clearly traced from the original source product to the end product, it is necessary that the marking can be implemented very quickly and with little effort on the one hand and that the subsequent identification can also be carried out with a high throughput.

In the German patent publication DE 10 2014 207 323 B4 it is disclosed to make a random pattern and another code visible with light of different composition. This requires a two-step reading process, which first makes the random pattern visible and in a further step the code is to be made visible.

The European patent specification EP 2 296 911 B1 discloses the application of a random pattern and a code to the object at. The random pattern is encoded in a hash, a sequence of characters and digits that can be uniquely derived from the random pattern. The random pattern is encoded in a so-called hash, a sequence of characters and digits that can be uniquely derived from the random pattern. However, the hash is not signed.

The European patent application EP 2 930 699 A1 discloses to apply a random pattern and a code to the object. The random pattern is encoded in a so-called hash, a sequence of characters and digits that can be uniquely derived from the random pattern. This hash is also printed on the object in encrypted form.

European patent specification EP 2 296 912 B1 discloses applying a random pattern and a code to the object using an electrically conductive varnish. Further authenticity features are accommodated in the electrically conductive lacquer.

The German patent application DE 10 304 805 A1 and the U.S. Pat. No. 7,353,994 B2 also disclose applying a random pattern and a code to the object. The random pattern is also encoded in a so-called hash, a sequence of characters and digits that can be uniquely derived from the random pattern. This hash is additionally printed on the object in encrypted form.

In U.S. Pat. No. 7,576,842 B2, the random pattern is further enriched by a height dimension during printing, so that the location of the individual pigment domains can be characterized with three coordinates. This increases the hurdle for copying the random pattern.

In the US patent application 2016 007 8307 A1, the random pattern of pigment domains is further enriched by a relaxation pattern during phosphorescence.

In U.S. Pat. No. 10,019,627 B2, the random pattern of pigment domains is further enriched by parallax-related imaging differences.

According to the teachings of the German patent DE 10 2015 219 400 B4, once a random pattern of fluorescent pigment domains has been applied, it is reapplied to the object as a black and white pattern. For the authenticity test, the random pattern is compared with the printed pattern.

The international patent application WO 2019/197 628 A1 teaches how to detect authenticity by comparing an applied random with a stored reference image. The reference image is stored in a database.

The aforementioned methods are optimized to increase the hurdle of copyability by adding further observables to the random pattern. Other methods solve the problem that an authenticity check can also be performed offline, i.e. without a data connection to an authoritative database.

However, it is the task of the invention to provide a method for individual marking and a corresponding method for individual identification of an individual object, which allows high production throughputs. The marking process and also the identification process should be capable of being carried out quickly.

SUMMARY OF THE INVENTION

The problem underlying the invention is solved by a method according to one or more of the present embodiments. Further advantageous embodiments are described herein. The identification may be solved by a method according to one or more embodiments.

According to the idea of the invention, the following steps are provided: After the known random distribution of pigment domains on an object, whether by brushing, printing, slapping, spraying or in any other way, a recording of an image of the pigment domains takes place. This recording can be done with a digital camera of the type described. The captured image is then subjected to an automated analysis. The automated analysis includes identifying the two-dimensional coordinates of each pigment domain captured in the image. In this case, the number of pigment domains found in the image depends on the concentration of pigments in a coating and a toner or in a spread. It has been found to be advantageous if a lower two-digit number of pigment domains is found during uptake. Identification can be assisted if the pigments fluoresce or phosphoresce. The intrinsic luminescence allows contrast filtering by appropriate exposure, which is so strong that the fluorescent or phosphorescent pigment domains appear as the only points of light in the digital camera image. However, with today's image recognition algorithms, it is also possible to detect and identify non-fluorescent pigments in an image. After identifying the individual pigment domains, a determination of the two-dimensional distance of each pair of two pigment domains follows. This results in $(n^2+n)/2$ distances if exactly n pigment domains are present. Furthermore, each triple of pigment domains forms a uniquely determinable angle. For this, there are m over 3 possibilities, calculated from $m!/(3!*(m-3)!)$, to determine one angle each of a triple of pigment domains from m pigment domains. Thus, the number of reciprocal distances grows with the square of the number of identified pigment domains. The number of determinable angles grows with the mathematical factorial of the number of pigment domains. Because the numbers become quite large quite quickly, there should not be too many pigment domains in an acquired image. After determining the two-dimensional distance of each pair of two pigment domains and/or determining all angles of each pigment domain triplet, the distances and/or angles determined in the previous step are stored in a list. This list is complete, which is later revisited during identification. The list is again stored in a database, with more than one database. So the list is stored randomly or according to any ordering system in one of the multiple databases. The list is enriched with meta-information about the manufacturing and/or refining parameters of the product when it is stored in the database. Such meta-information can be simply the manufacturing date and/or the manufacturing time. It can be a batch number, it can also be manufacturing parameters such as analysis data of a food product, a beverage or a drug, or test run data of a mechanical object. Likewise, it can be temperature history of a supply chain or chemical analysis data. The type of data here is very diverse. Finally, an information unit is applied to the object, preferably in machine-readable form. The information unit can be printed or applied to the object in any other way, whereby the information unit can be uniquely assigned to a database.

It has been found to be very advantageous if provision is made for brushing or printing an ink, toner or varnish for applying the random distribution of pigment domains, wherein the ink, toner or varnish comprises fluorescent or phosphorescent pigments, and wherein the concentration of the fluorescent or phosphorescent pigments in the ink, toner or varnish is such that between 4 and 50, preferably between 4 and 20 pigment domains are applied when marking an area of 1 $cm^2$. The concentration depends on the printing or coating process. If the printing or coating process uses more coating, ink or toner, the concentration of pigments can be correspondingly lower, and vice versa. Marking with an information unit can either disturb the aesthetic appearance of the object or influence the function itself. For this purpose, the use of an ink, a toner or a varnish can be provided for applying the information unit, whereby the ink, the toner or the varnish is invisible to the human eye due to its color and/or its transparency in the applied state under light conditions usual for human vision, but at least not perceptible at a fleeting glance. This means that the marking does not overlap with other markings, such as so-called EAN codes, which are uniquely assigned codes for marking consumer products that simplify inventory in retail and the identification of the object at the checkout.

In a particular embodiment of the process, it may be provided that the ink, toner or varnish fluoresces or phosphoresces when excited by irradiation with light in the visual range from 380 nm to 780 nm, preferably in the range of light with a wavelength between 380 nm to 500 nm, particularly preferably in the range between 400 nm to 470 nm. The fluorescence or phosphorescence is thus triggered with light in the visual range. Suitable pigments for this purpose are those that fluoresce or phosphoresce when irradiated with violet light or with blue light. The use of such pigments has the advantage that the pigment domains or the information unit can be illuminated with visual light, so that when handling the light source it is impossible for a user to blind or damage his eyes. Especially with very high product throughput, the UV dose for the user is reduced.

Depending on the requirements of the trade or the production chain, it may be advantageous if at least parts of the information unit can be erased or can be erased completely. For this purpose, it is possible to use an ink, a toner or a varnish which fades by irradiation with light in the UV-C to UV-B range, preferably with light having a wavelength in the range from 240 nm to 380 nm, particularly preferably by irradiation with light having a wavelength in the range from 240 nm to 315 nm. The fading allows relabeling or even bonding of the object to a new database that is pertinent after product refinement. Alternatively or cumulatively, the use of a ink, toner or varnish may be provided that can be thermally bleached. This can be used to demonstrate that, for example, a beverage in the closed can has been properly pasteurized. Suitable pigments for bleaching are those that are fluorescent or phosphorescent and can be thermally bleached at temperatures between 80° C. and 120° C., so that heating to this temperature bleaches the ink, toner or varnish.

Up to this point, the individual marking steps and the advantageous embodiments of the marking process have been explained. After marking, identification follows at a later point. The previously marked object is now identified as follows, namely by irradiating the pigment domains with light in the visual VIS range in the range of a wavelength of light from 380 nm to 780 nm, preferably with light in the range of light with a wavelength between from 380 nm to 500 nm, particularly preferably with light in the range of light with a wavelength in the range between 400 nm to 470 nm. The object is thus irradiated with visual light, preferably with blue light. In this process, the pigment domains become visible when they fluoresce and/or phosphoresce. This is followed by taking a picture of the pigment domains. This can be done with a digital camera. In the image, the following steps are performed by an algorithm for automatic image analysis: first, an identification of two-dimensional coordinates of pigment domains captured in the image and determination of two-dimensional distances between pairs of pigment domains and/or determination of angles, spanned by pigment domain triples, of the pigment domains identified in the step before. Furthermore, a reading of the information unit from the surface of the object, whereby the information unit, from which an identifier can be uniquely derived, can be uniquely assigned to a database, and determining the resulting database. This identified database is then queried for a list, which has the previously stored and related list in the marking step, the previously determined distances and/or angles, whereby the database outputs the corresponding data record. From the data record follows the reading of the meta information.

When identifying, it may be possible to query all specific distances and/or angles of the pigment domains in the database. However, it may also be possible to query a subset of distances and/or angles. The previously described method for identification is thus supplemented by the following steps: determining a number of n pigment domains from a number m of identified pigment domains, where n is smaller than m and where the n pigment domains are the brightest pigment domains when irradiated, and querying the database with n distances from $(m^2-m)/2$ possible distances and/or querying k angles from $m!/(3!*(m-3)!)$ possible angles, where n and k are preferably larger than 4. Surprisingly, it turned out that already from four distances the variation of the random patterns by the number of distances and angles becomes so extremely large that with the query, which previously stored complete list in the database has the almost arbitrarily determined n distances and/or k angles. The variation arises partly from the choice of more than one database and from the random spacing patterns and/or angle patterns of the n brightest pigment domains. If the number of databases is sufficiently large so that sufficiently few individual objects are stored in each individual database, the identification of the object also becomes sufficiently individual.

The entire marking and identification process allows the use of a commercially available cell phone with camera and lamp or a tablet computer with camera and lamp to perform the identification process. The lamp of the camera to be used or of the tablet computer to be used emits white light and/or light in the visual VIS range from 380 nm to 780 nm, preferably light with a wavelength between from 380 nm to 500 nm, particularly preferably light with a wavelength in the range between 400 nm to 470 nm. The lamp of today's cameras and tablet computers often has a high blue content. With this, one performs the following steps: Illuminating the pigment domains with the light of the lamp and a recording of the pigment domains with the camera, and finally performing the further method steps with the cell phone or the tablet computer. The use of the cell phone or the tablet computer is suitable for use in the identification of an object, for example, by an end customer. In high throughput manufacturing processes, suitable industrial cameras would be used for this purpose.

Since not all objects have flat surfaces, it may be necessary to apply the random pattern of pigment domains to a curved surface. This is the case, for example, with cans, bottles or semi-finished products without a flat surface. In order to identify these objects unambiguously, compensation optics can be used to compensate for the curvature of the surface. For this purpose, the compensation optics are adapted to the curvature of the object. Depending on the performance of the camera optics, the compensation optics can either only compensate for the curvature and produce a flat image of the curved surface or adjust a macro lens setting of the camera optics so that the very shallow depth of field of the camera optics is adapted to the curved surface.

Alternatively or cumulatively to the compensating optics, a macro lens can also be used as an attachment lens in order to be able to image well and closely the usually quite small markings, which are in the range of 1 $cm^2$ to 2 $cm^2$.

In a particular embodiment of the method according to the invention, the information unit may be that certain fluorescent and/or phosphorescent colors are present in the pigment domains. If the marker is to be read with a commercially available cell phone or tablet computer, at least three color channels are available which the camera can clearly distinguish. If markers are now used that make use of one of three colors, two of three colors or all three colors, it is possible to form 7 color combinations from them in order to make a database assignment. High-quality cameras of cell phones can distinguish even several colors still well, so that with the use of n colors altogether 2n color combinations can be formed, which are usable as data base assignment parameters.

BRIEF DESCRIPTION OF THE DRAWINGS

The invention is explained in more detail with reference to the following figures in which:

FIG. 5 shows the random coating from FIG. 4 with distances of selected pigment domains drawn in.

DETAILED DESCRIPTION OF THE PREFERRED EMBODIMENTS

Figure 1:
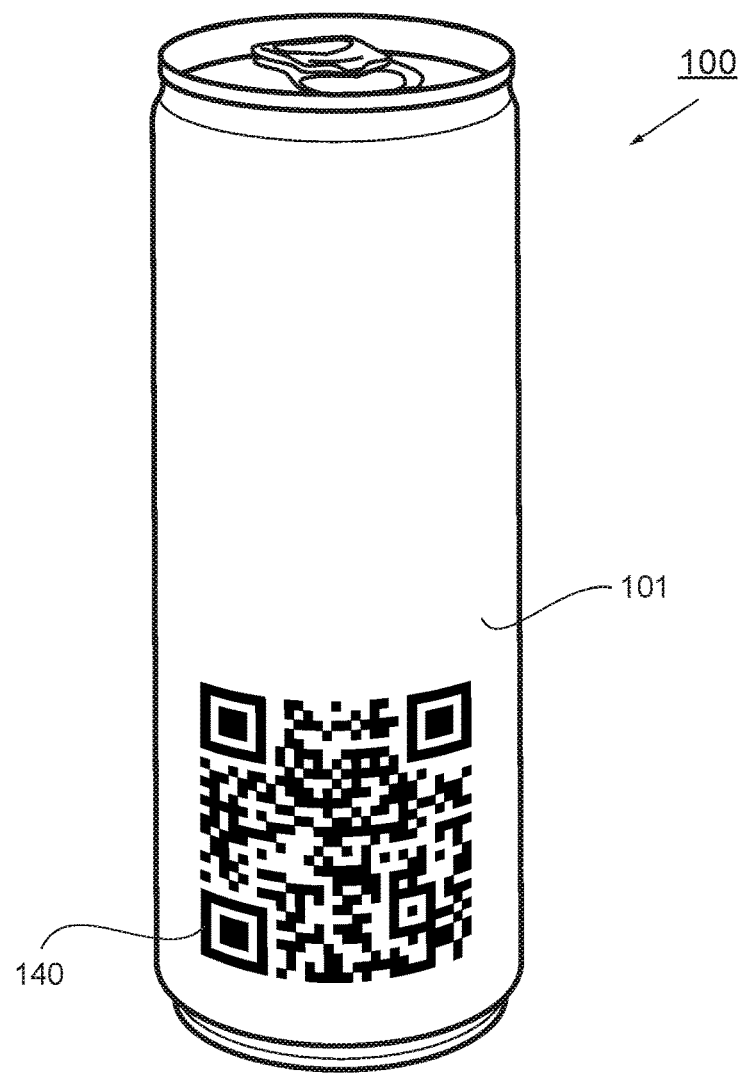
FIG. 1 shows A commercially available beverage can with a QR code applied as an example of an object without a flat surface.

FIG. 1 shows a commercially available beverage can as an object 100 with an applied QR code as an example of an object without a flat surface. The QR code as an information unit 140, which can be designed to be invisible to the human eye, or at least barely perceptible, by selecting a fluorescent ink, a fluorescent varnish or a fluorescent toner, can contain information that identifies a database in which data about this individual can is contained. Different databases can be, different database servers at different places in the world, different database programs on the same server, but also data sets within a database that form a coherent data set as a virtual database by a common data set, such as a recognition ID.

In FIG. 1, it is shown that the surface 101 of the can as the object 100 does not have a flat surface.

Figure 2:
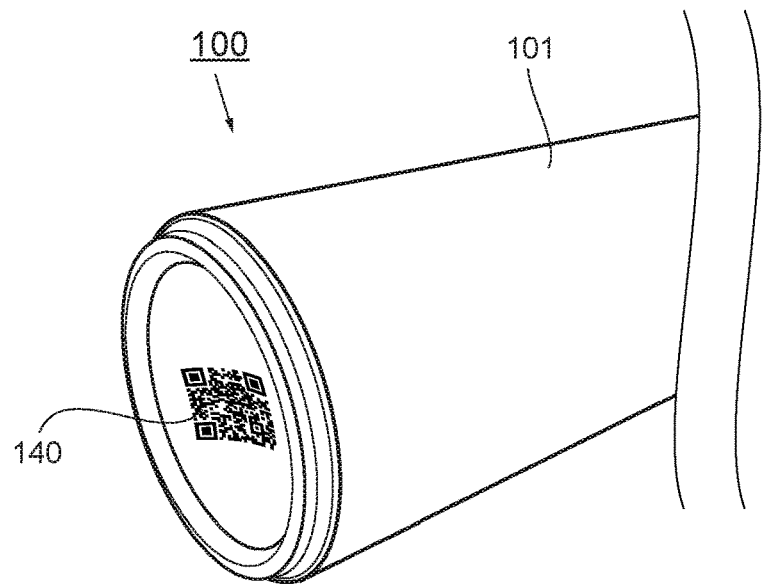
FIG. 2 shows the beverage can from FIG. 1 with a perspective view of the concave bottom with inverse half-calotte.

FIG. 2 shows a perspective view of the beverage can from FIG. 1, looking at the concave bottom with inverse half-cup. As with bottles, the inverse half-calotte is introduced into the can in order to better withstand the pressure inside the can. Instead of being printed on the can body, a QR code can also be printed on the curved can base.

Figure 3:
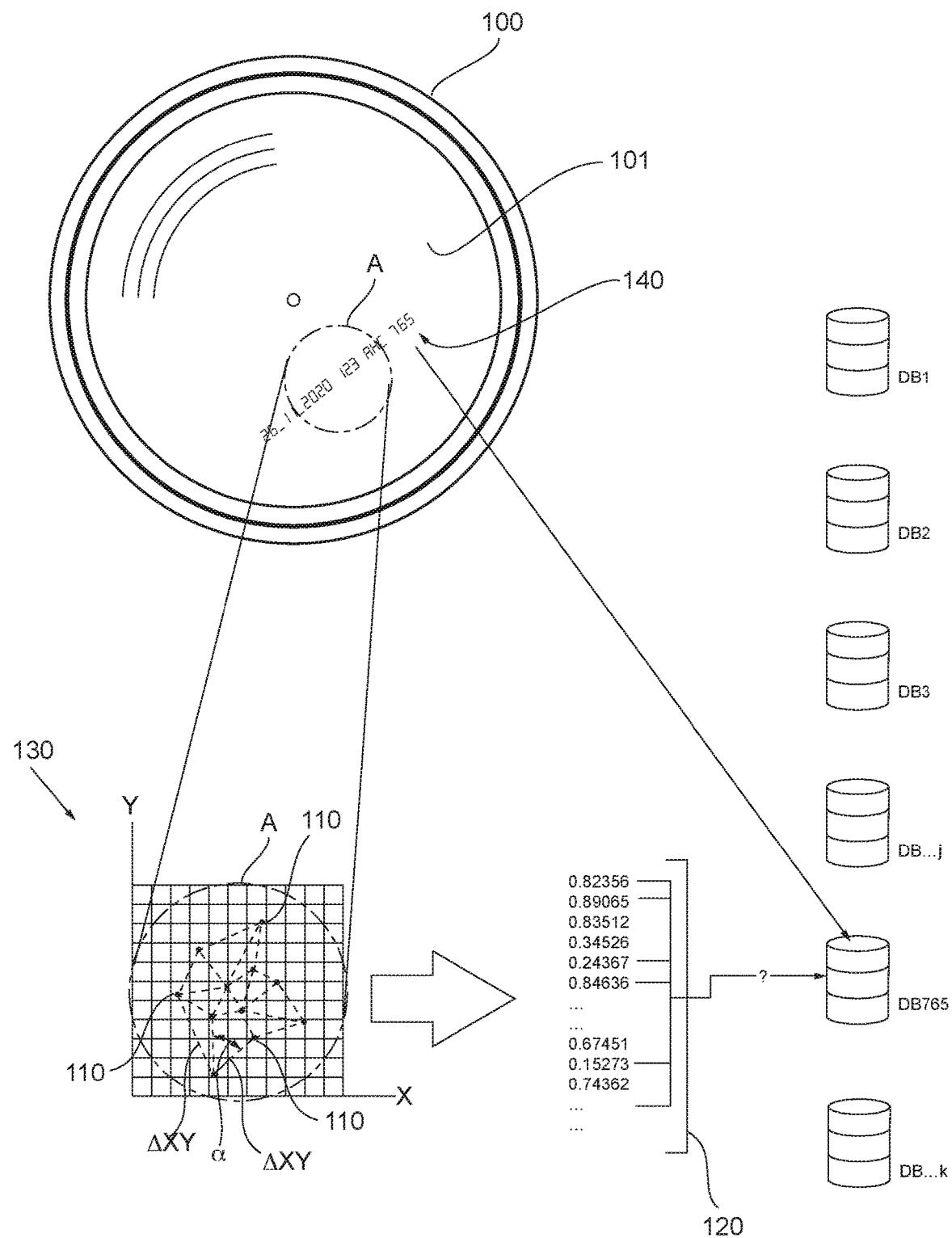
FIG. 3 shows a view of the inverse half-calotte from FIG. 2 in a top view with a sketch to illustrate the relationship between the marking and the database.

FIG. 3 shows a top view of the inverse half-can of FIG. 2 with a sketch to illustrate the relationship between the marker and the database. The can as object 100, has a concave surface 101 on the bottom side. On this surface, in the area of detail A, an imprint or coating is applied with a toner, a varnish or an ink which contains fluorescent or phosphorescent pigments. An information unit is printed across the surface in detail A. In this example, the information unit is shown not as a QR code but as a 7-segment representation, which is likewise machine-readable. For example, the information unit includes a number "765" that serves as an identifier for one or more databases. The detail A contains fluorescent or phosphorescent pigments. When taking an image 130 of the detail A with the pigment domains 110 present there, the coordinates X and Y of each pigment domain are determined and also the distances ΔXY between each two pigment domains as a pigment-domain pair. The determined distances are summarized in a list 120 and stored in a database, here for example database DB765. The content of the information unit 140 is directly assignable to the database DB765.

Figure 4:
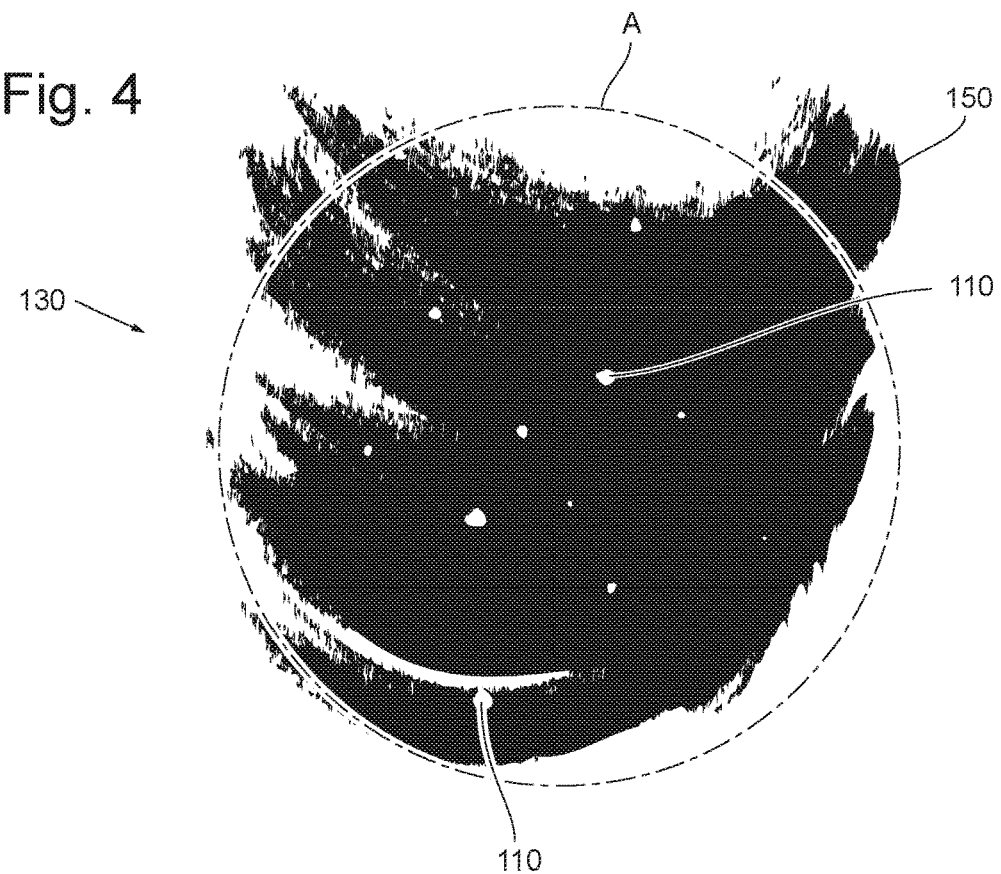
FIG. 4 shows an example of a random coating with a pigment-containing ink as enlarged detail A.

FIG. 4 shows an example of a random smear with a pigment-containing ink as an enlarged detail A from FIG. 3, where detail A is captured as image 130. The smear can be random, like a brush stroke, but it can also be straight and repeatably delineated. This depends on the choice of marking method. Within the smear of ink 150 are pigment domains 110 that are randomly distributed in size and position.

Figure 5:
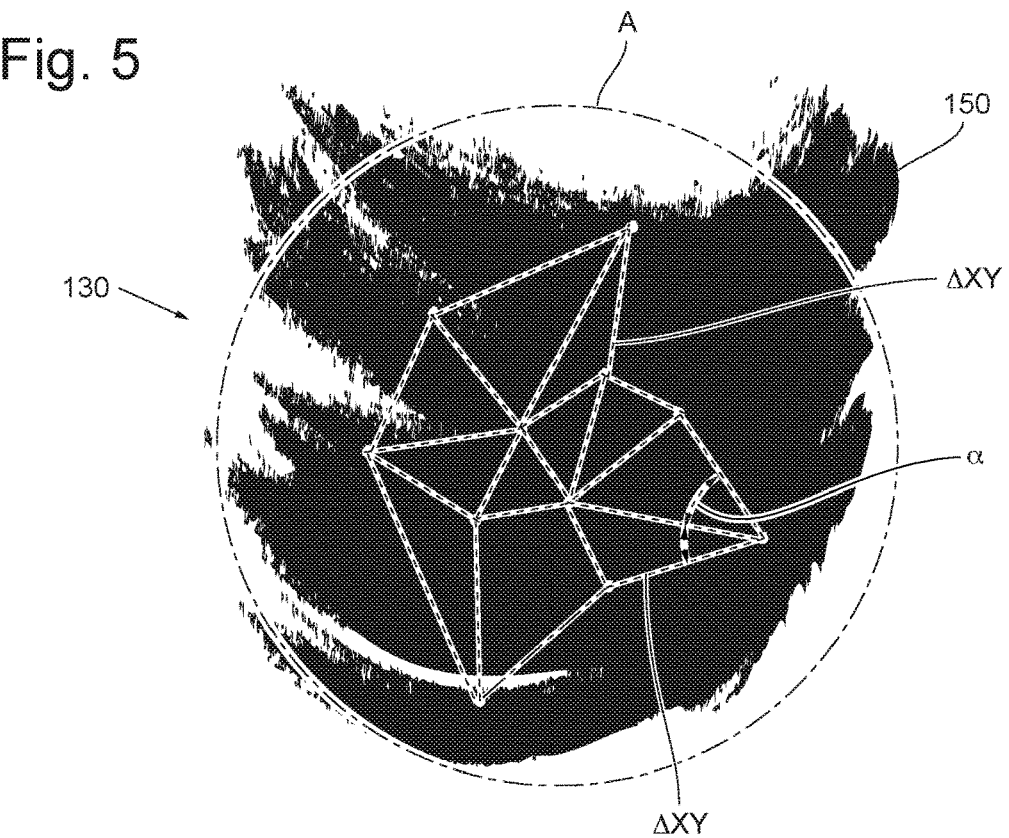

FIG. 5 shows the random coating from FIG. 4 with the distances ΔXY of selected pigment domains drawn in. Here, only those distances are drawn whose connecting line does not represent a crossover with any other connecting line. Thus, fewer connecting lines are shown than there are possible distances ΔXY according to $(m^2-m)/2$, where m is the number of pigment domains. To identify this can, it is possible to ask in the database DB765 chosen here for example, which complete list with all $(m^2-m)/2$ contains the distances drawn here.

Figure 6:
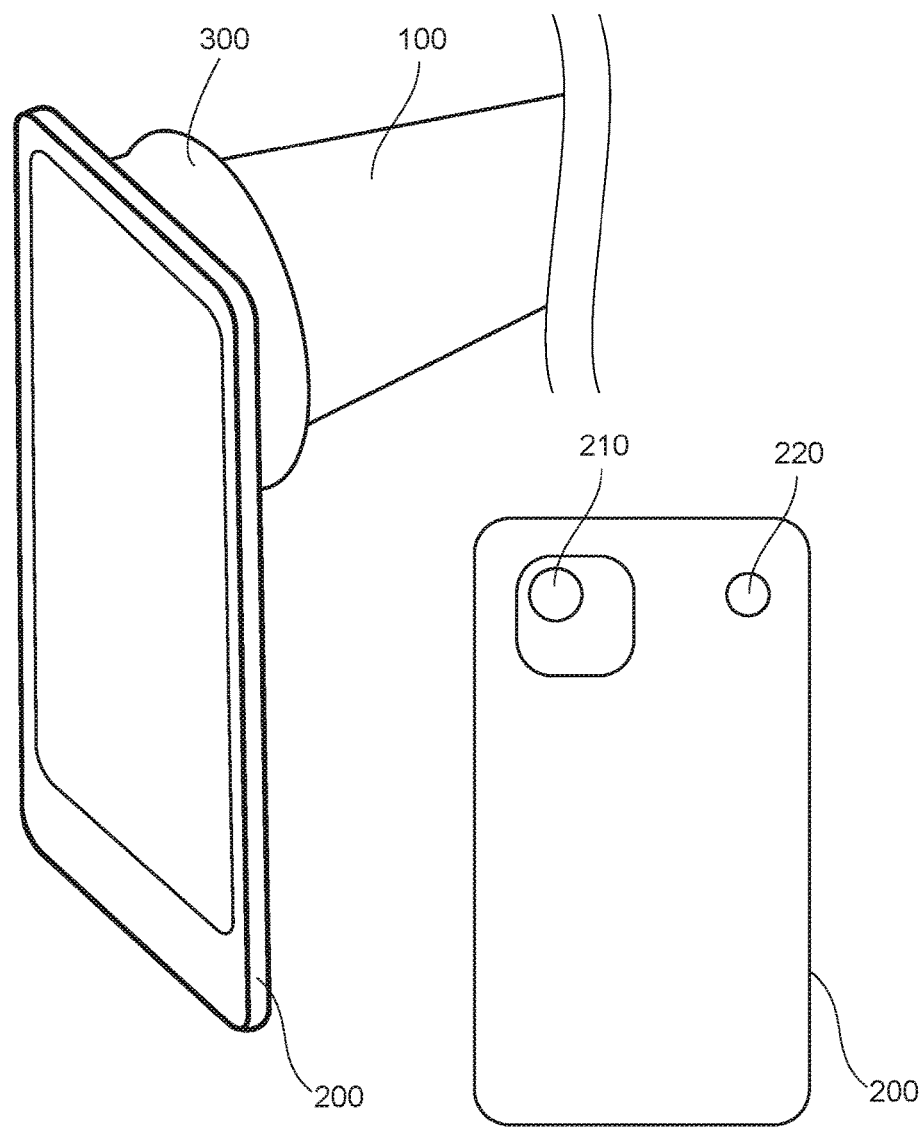
FIG. 6 shows Connection of a commercially available cell phone to a beverage can of FIGS. 1 and 2 via a compensating optical system.

In FIG. 6, a connection of a commercially available cell phone 200 with a beverage can as the object 100 of FIGS. 1 and 2 via a compensation lens 300 is outlined. The lens of the camera 210 of the commercially available cell phone 200 is enabled to read from extreme proximity both the pigment domains 110, not shown here, and the information unit 140, also not shown, from the curved bottom of the can as the object 100 via the compensation optics 300, which includes a compensation lens 303.

Figure 7:
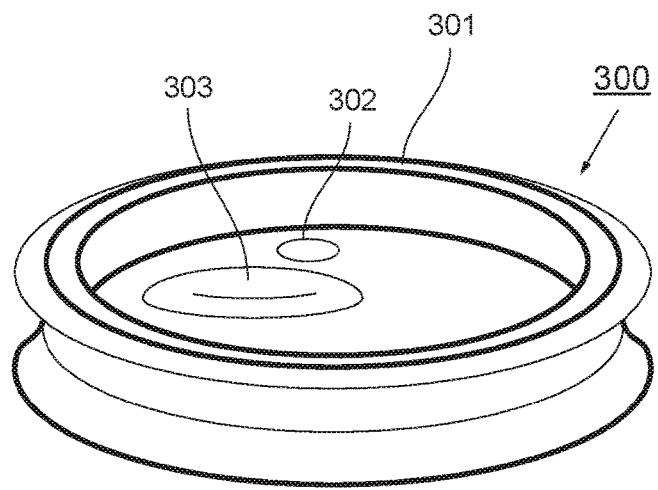
FIG. 7 shows An isolated compensation optic from FIG. 6, and, FIG. 8 shows a diagram illustrating the classification of light spectra with different wavelength ranges.

FIG. 7 shows a compensating optic 300, which is designed here for use with a commercially available cell phone 200. A mounting ring 301, which may be made of rubber or plastic, has a lamp recess 102 inside so that the lamp of the commercially available cell phone 200 can illuminate the bottom of the can as the object 100. Further, the compensating optics 300 includes a compensating lens 303 which, when mounted, is disposed immediately above the camera lens of the camera 210 and, like eyeglasses or an additional lens, enables the camera lens to look at and focus on the extremely close and curved bottom of the can as the object 100.

Figure 8:
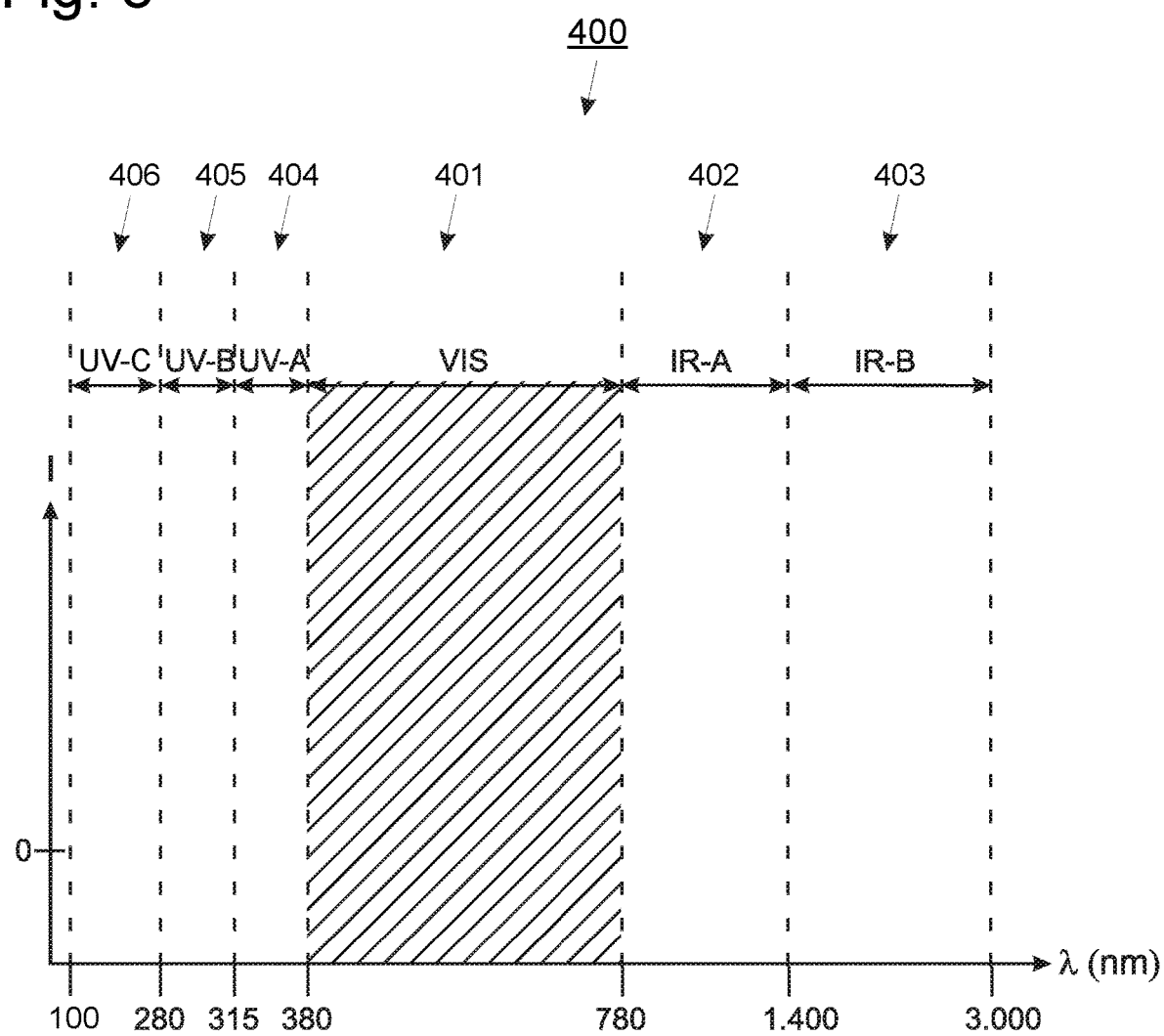

Finally, FIG. 8 shows a diagram 400 to illustrate the classification of light spectra with different wavelength ranges. Light has a visual VIS range 401 in the center of its entire wavelength range, namely starting at a wavelength of 380 nm up to a wavelength of 780 nm. Within this visual VIS range, excitation of the fluorescent and/or phosphorescent pigment particles is to occur. Adjacent to the visual VIS region 401 at longer wavelengths is a near IR-A infrared region 402 ranging from 780 nm wavelength up to 1,400 nm wavelength, followed by a far IR-B infrared region from 1,400 nm wavelength up to 3,000 nm wavelength. In the short wavelength region, the VIS region 401 is adjacent to the UV-A region 402, which ranges from 315 nm to 380 nm. The UV-A region 404 is followed to shorter wavelengths by a UV-B region 405 with a wavelength interval from 280 nm to 315 nm. The UV-C region 406 follows with a wavelength range from 100 nm wavelength to 280 nm wavelength. In this region, a light source may emit light to optionally bleach the information unit 140.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 100 object
101 surface
110 pigment domain
120 list
130 image
140 information unit
150 ink
200 cell phone
210 camera
220 lamp
300 compensation optics
301 mounting ring
302 lamp recess
303 compensation lens
400 spectrum
401 VIS
402 IR-A
403 IR-B
404 UV-A
405 UV-B
406 UV-C
α angle
A detail
DB1 1. database
DB2 2. database
DB3 3. database
DBj j. Database
DB765 765. database
DBk k. Database
ΔXY distance
X coordinate
Y coordinate

The invention claimed is:

1. A method for uniquely marking an object, wherein a random distribution of individual pigment domains is applied to a surface of the object, and wherein a list of distances of the individual pigment domains from each other is measured and stored in a database, the method comprising:
   acquiring an image of the pigment domains,
   identifying two-dimensional coordinates of each pigment domain captured in the image,
   determining a two-dimensional distance of each pair of two pigment domains, or determining an angle of each triplet of pigment domains, or determining both,
   saving the distances and angles determined in a list,
   storing the list in a database, the list being enriched with meta-information about manufacturing parameters, or finishing parameters, or both of the object, and,
   applying a database identification as information unit to the surface of the object, wherein the information unit is configured to be uniquely assigned to the database.

2. The method according to claim 1, further comprising:
   painting or printing an ink, a toner or a varnish to apply the random distribution of pigment domains,
   wherein the ink, toner or varnish comprises fluorescent or phosphorescent pigments,
   wherein a concentration of the fluorescent or phosphorescent pigments in the ink, in the toner or in the varnish is such that between 4 and a maximum of 50 pigment domains are applied when marking an area of 1 cm$^2$.

3. The method according to claim 1, further comprising:
   using an ink, a toner, or a varnish for applying the information unit,
   wherein the ink, the toner, or the varnish, by virtue of a color, or a transparency when painted or printed, or both, is invisible to a human eye under lighting conditions customary for human vision or at least is not perceptible at a cursory glance.

4. The method according to claim 3, wherein the ink, toner, or the varnish fluoresces or phosphoresces when excited by irradiation with light having a wavelength between from 380 nm to 780 nm.

5. The method according to claim 3, in the ink, the toner, or the varnish bleaches by irradiation with light in a UV-C range to UV-B range.

6. The method according to claim 1, wherein the information unit is provided by a combination of fluorescent colors, phosphorescent colors, or both present in the pigment domains.

7. A method for identifying an object, which has been marked according to the method of claim 1, comprising:
   irradiating the pigment domains with light having a wavelength between 380 nm to 780 nm,
   acquiring an image of the pigment domains,
   identifying two-dimensional coordinates of pigment domains in the acquired image,
   determining two-dimensional distances between pairs of pigment domains of the pigment domains, or determining angles spanned by three pigment domains, or determining both,
   reading out the information unit from the surface of the object and determining the database,
   querying the database, said database having the list and the determined distances, said database outputting the corresponding data set, and,
   reading the meta-information from the database.

8. The method according to claim 7, further comprising:
   subsequently irradiating the information unit with light having a wavelength in a UV-C range to UV-B range, so that the information unit bleaches, or heating the information unit to a temperature between 80° C. and 120° C. so that the information unit bleaches, or both.

9. The method according to claim 7, further comprising:
   determining a number of n pigment domains from a number of m identified pigment domains, wherein n is less than m and wherein the n pigment domains are the brightest pigment domains upon irradiation,
   querying the database with n distances from $(m^2-m)/2$ possible distances, where n is preferably greater than 4, or querying the database with k angles from m! (3!* (m−3)!) possible angles, or querying the database with both.

10. The method according to claim 7, further comprising:
    using a cell phone or a tablet computer equipped with camera and lamp, wherein the lamp emits the light,
    illuminating the pigment domains with the light of the lamp,
    recording the pigment domains with the camera, and
    performing the further method steps with the cell phone or the tablet computer.

11. The method according to claim 7, further comprising:
    using compensating optics to capture the image, wherein the compensating optics compensates for a non-planar surface of the object, or
    using a macro lens as an attachment lens to capture the image, or
    both.

12. The method according to claim 7, further comprising:
    calculating the surface of the object deviating from a plane,
    wherein a predetermined location having a predetermined shape is assumed for the location of the random distribution of the individual pigment domains on the surface of the object.

* * * * *